March 9, 1965

W. C. RUBINSTEIN 3,172,948

BILLING SYSTEM FOR SUBSCRIPTION TELEVISION
USING CENTRAL RECORDING

Filed April 18, 1961

WILLIAM C. RUBINSTEIN
INVENTOR.

BY *Lyon & Lyon*

ATTORNEYS

March 9, 1965 W. C. RUBINSTEIN 3,172,948
BILLING SYSTEM FOR SUBSCRIPTION TELEVISION
USING CENTRAL RECORDING
Filed April 18, 1961 2 Sheets-Sheet 2

WILLIAM C. RUBINSTEIN
INVENTOR.

BY Lyon & Lyon
ATTORNEYS

United States Patent Office 3,172,948
Patented Mar. 9, 1965

3,172,948
BILLING SYSTEM FOR SUBSCRIPTION TELEVISION USING CENTRAL RECORDING
William C. Rubinstein, Los Angeles, Calif., assignor to Paramount Pictures Corporation, New York, N.Y., a corporation of New York
Filed Apr. 18, 1961, Ser. No. 103,800
10 Claims. (Cl. 178—5.1)

This invention relates to remote billing systems and, more particularly, to a billing system suitable for use in closed-circuit subscription-television systems.

A number of different systems have been proposed for enabling the billing of subscribers to subscription-television systems for programs purchased. Contrary to community antenna systems, wherein each subscriber pays a fixed monthly fee, the subscriber to a subscription-television system has the option as to whether or not he wishes to purchase a program, and, further, programs are provided for which the purchasing price may differ.

A number of prior-art systems have been suggested, such as providing a signal generator at each receiver which has either a unique oscillation frequency or provides a unique signal pattern which can be applied to the line connecting the subscriber receivers to the central transmitting location and can be detected there for the purpose of billing.

Another system which has been proposed is one wherein a telephone call is placed to obtain a key signal for a program. The maker of the telephone call can then be billed for the program. These systems have one common problem—they are extremely expensive. Further, the use of equipment for separating oscillations or code signals at the central location, although feasible where the number of subscribers is very small, rapidly becomes impractical as the number of subscribers increases. The telephone-call system also becomes impractical when the telephone system overloads.

An object of this invention is the provision of a subscriber billing system for subscription television which is more inexpensive than those proposed heretofore.

Another object of this invention is the provision of a subscription-television billing system which is suitable for any number of subscribers.

Yet another object of this invention is the provision of a novel, unique, and simple subscription-television billing system.

These and other objects of the invention may be achieved by an arrangement wherein at each receiver the subscriber who wishes to purchase a program is required to actuate a switch, called a program-purchase switch, whereupon he may receive that program. Further apparatus at the receiver includes what may be described as a movable cam having an initial position from which it starts and to which it may be returned at the end of a billing interval. Placed in the path of the cam to be actuated thereby momentarily is a normally open switch. The switch position relative to the initial cam position is made such that as all cams are moved together the normally open switch is closed at a different time at each receiver relative to the starting time.

Conductor means are provided to extend between a central location and all the receivers to be billed. Means are provided at each receiver for connecting the program purchase switch and normally open switch in series and to the conductor means. Means are also provided whereby the movable cam can be moved in response to signals which are received over the conductor means. The conductor means may include auxiliary conductors or may include the coaxial cable itself, to which all subscriber receivers are connected.

At the central location there is provided a means for applying the signals whereby the advance of the movable cams at each one of the receivers is enabled. There is also provided at the central location a detector capable of detecting whether or not the program purchase switch at the receiver, to which connection is being made, has been operated. Further, there is provided at the central location a recording means, such as a punched paper-tape apparatus, which is synchronously advanced in response to the signal which effectuated operation of the various movable cams and makes a recording in response to the output of the detector.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
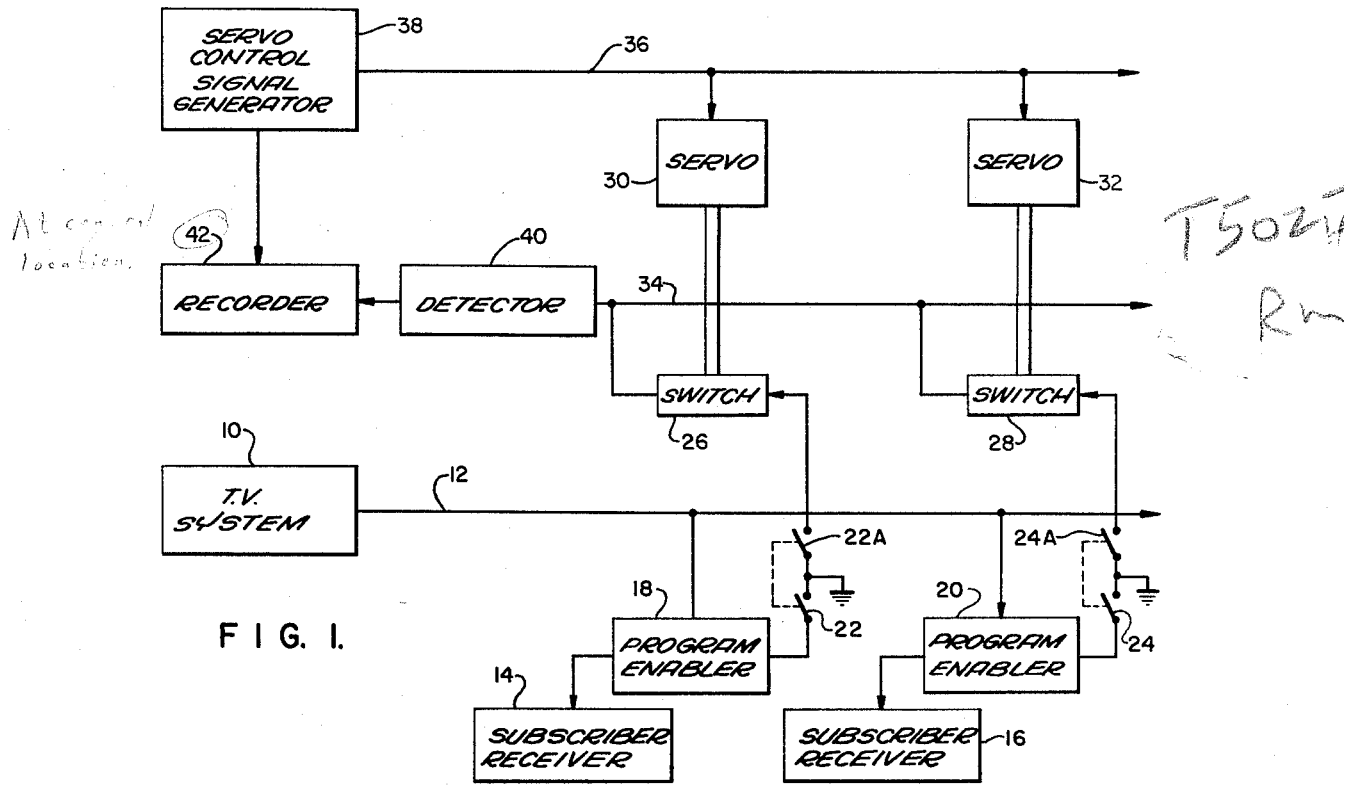
FIGURE 1 is a block diagram of an embodiment of the invention.

A subscription-television system of the general type with which this invention is intended to be used will have, at a central location, a television system 10, which represents the audio and video program-signal generators and transmitters. These are transmitted over a line 12 to the various subscriber receiver locations. Two locations are represented by way of exemplification. At each subscriber location there is provided an attachment for the subscriber receivers, respectively 14, 16, which attachment is designated here as the program enablers, respectively 18, 20. These program enablers can be any of the known arrangements for either withholding a program from the subscriber receiver, such as filters or noise generators, until the subscriber has indicated that he will pay for the program, or apparatus which can convert a program which is received in a form unintelligible to the receiver to a form intelligible to the receiver upon an indication that payment for the program has been made. Such agreement by subscriber to pay for the program may be made by apparatus here exemplified as a double-pole double-throw switch, respectively 22, 24. When the double-pole double-throw switch is closed, the program enabler is either bypassed, so that the subscriber receiver 14, 16 can reproduce the program, or the program enabler is made to become operative, to render the program being received intelligible.

As indicated, the double-pole double-throw switches, respectively 22, 24, may each be actuated when the subscriber at that location desires to see the program. The contacts, respectively 22A, 24A, are used for the purpose of indicating to a central location whether or not a program has been purchased, whereby the proper billing may be prepared. Accordingly, at each location these contacts are connected to apparatus also provided at that location to enable this purpose to be effectuated.

At each location there is accordingly provided a switch, respectively 26, 28, which may be operated by a suitable type of servo apparatus, respectively 30, 32, so that the switch at any given subscriber receiver location is closed only when all the other switches at the other subscriber receiver locations are open. At each location the program-enabling switch 22A, 24A is connected in series with the switch, respectively 26, 28, and, in turn, each of these is connected to conductor means or line 34, which extends to all receiver locations from a central location. Another line 36 extends from the central location to all of the subscriber locations and each one of the servos is connected to said line.

At the central location there is provided a servo control-signal generator 38, which is connected to line 36, and which provides signals which are required to operate the servos 30, 32, whereby they will successively close the switches 26, 28. At the central location there is also provided a detector 40, which is connected to the line 34, which detects at each subscriber location to which connection is made through an operated one of the switches 26, 28 whether or not the program-enabling switch, respectively 22A, 24A, has been operated. A recorder 42 at the central location will respond to the output of the detector 40 and will be advanced under the control of the recorder 38, so that whatever record is prepared will represent for each subscriber whether or not he has purchased a program which is being transmitted.

Figure 2:
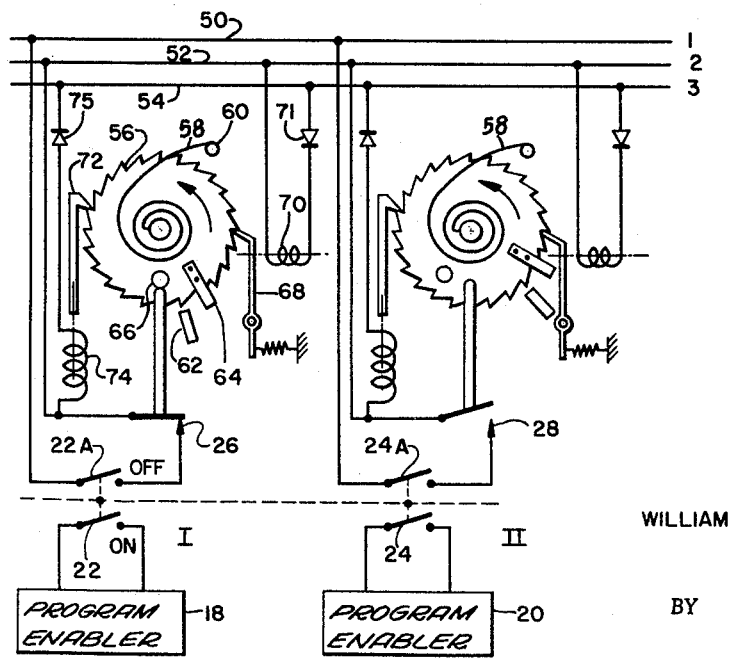
FIGURE 2 is a diagram exemplifying apparatus required in accordance with this invention at the receiver locations.

FIGURE 2 represents apparatus which is required in accordance with this invention at a receiver location. With this arrangement, three lines, respectively 50, 52, 54, are required to extend from the remote location to each one of the subscriber locations. At each subscriber location there is a ratchet wheel 56, which is pivotally supported and which is biased toward an initial position by means of a spring 58 attached at one end to the center of the ratchet wheel and at the other end to a post 60. The initial position of the ratchet wheel is defined by a fixed stop 62, which abuts with a stop 64 carried by the ratchet wheel when the ratchet wheel is returned to its initial position. The ratchet wheel also carries a cam 66, which can close the switch 26 when the ratchet wheel has been advanced a sufficient distance from its initial position. It will be appreciated, of course, that the ratchet wheel is advanced past the location of the switch 26, whereby the switch 26 will open again.

The position of each switch at each receiver is the same relative to the initial position of the stop 62 and 64 at each receiver. The successive operation of the switches is achieved by putting the cam 66 at each receiver at a different distance from the initial position as defined by the stops. Of course, an alternative obviously is to position the switches at different distances relative to the initial position. A holding pawl 68 engages the teeth of the ratchet wheel 56 and restrains it against the bias of the spring 58. The solenoid 70 has a rectifier 71 in series therewith and is connected across lines 52 and 54. The solenoid 70 is energized by an initiating signal of the proper polarity to remove the holding pawl 68 from engagement with the teeth of the ratchet wheel, whereby the ratchet wheel can return to its initial position. An advancing structure for the ratchet wheel comprises the advancing pawl 72, which is actuated by the solenoid 74 each time a pulse of the proper polarity is applied over the lines 52 and 54 to the solenoid 74 and rectifier 75 connected to these lines. The switch 26 is shown connected in series with the program-purchase switch contacts 22A. These series-connected switches are connected across the lines 50, 52.

Figure 3:
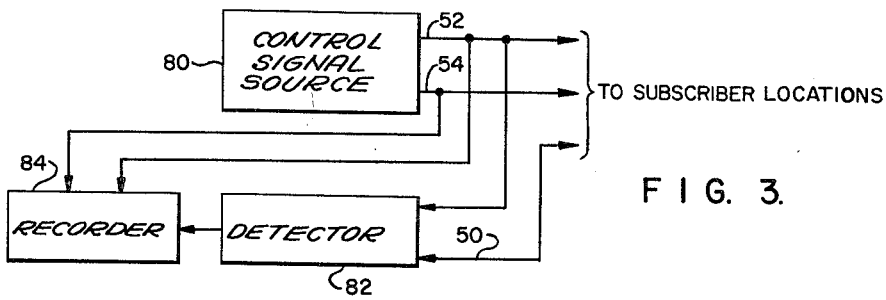
FIGURE 3 is a diagram illustrating apparatus required at a central location in accordance with this invention.

FIGURE 3 illustrates the apparatus required at the central location with apparatus of the type shown in FIGURE 2. There is a control-signal source 80, such as the servo control-signal generator 38 shown in FIGURE 1, which applies to the lines 52, 54 the necessary control signals for the servo arrangement exemplified by the ratchet wheels shown in FIGURE 2. These control signals will include, first, a pulse signal which the rectifier 71 in each of the subscriber locations can permit to be passed and applied to the solenoid 70 at each of these subscriber locations, whereby each one of the ratchet wheels is returned to its initial position with the blocks 62, 64 abutting one another. Thereafter, the control-signal source applies a sequence of pulses to the lines 52, 54, which have a polarity which can be passed by the rectifier 75. This rectifier is the one connected in series with the advancing solenoid 74 at each subscriber location.

Accordingly, after all the ratchet wheels are reset to their initial positions, the control-signal source 80 provides pulses which advance all the ratchet wheels simultaneously. In this manner, there will appear successively either a short or low-impedance condition across the lines 50, 52, or a relatively high-impedance condition across the lines, depending upon whether at each subscriber location the program-purchasing switch is closed or open. This is detected by an impedance detector 82, which emits an output each time it detects a low-impedance condition. The signals from the control-signal source are also applied to a recorder 84, which may be any known arrangement, such as a punched-tape recorder. This recorder is advanced under the successive signals received from the control-signal source and is actuated to pinch each time an output is received from the impedance detector 82. Since the sequence of testing the program-purchasing switches at each subscriber location is known, it is a simple matter to determine from the punched-tape record produced by the recorder 84 whether or not a subscriber has purchased the program. From this, the proper billing may be easily prepared.

Alternatively, the system may be arranged so that switches 26 and 28 in the subscriber's apparatus, in their nonactuated positions, put a negative voltage on line 34, but, in their actuated positions, put a positive voltage on line 34. In this event, detector 82 would detect the existence of a positive or a negative voltage on this line. A no-voltage condition could then be used to indicate a system voltage.

Figure 4:
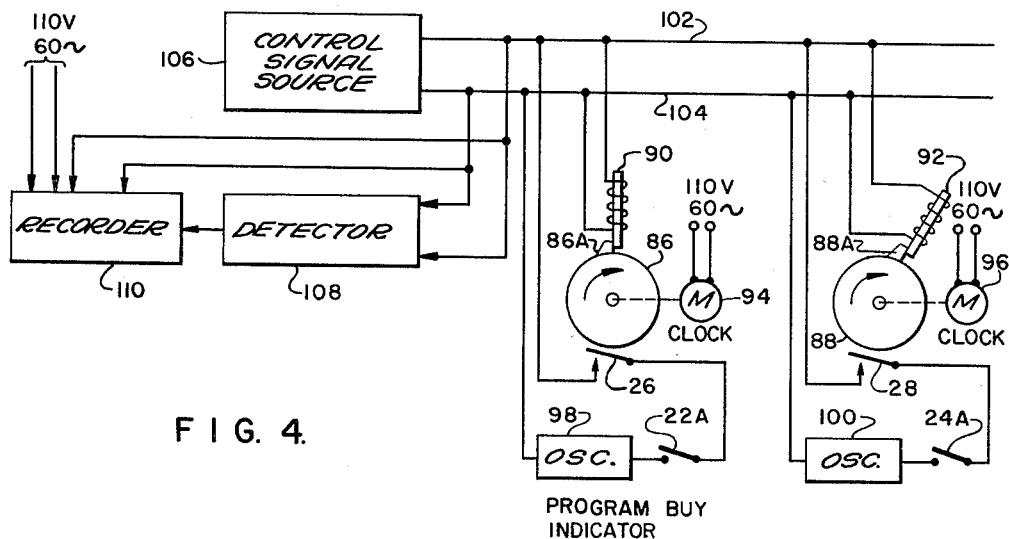
FIGURE 4 is a block diagram illustrating another subscriber billing system.

FIGURE 4 shows another embodiment of the invention. Here, at each receiver location, there is provided a movable cam 86, 88, which functions in a manner similar to the ratchet wheel shown in FIGURE 2. On each movable cam there is a cam surface, respectively 86A, 88A. This cam surface is moved through a circular path to close the momentary switches, respectively 26, 28, in succession. The initial position of the cams is defined by the location of the solenoid stop, respectively 90, 92, against which the respective cam surfaces 86A, 88A abut at the initial position. A clock motor, respectively 94, 96, is employed to drive the respective cams 86, 88. The clock motors may be driven from the 110-volt, 60-cycle mains, which are present at each house. Advantage is taken of the fact that the regulation of the power voltage and frequency is substantially accurate and can be maintained so over the brief interval during which it is desired to collect the billing information from the subscriber receivers.

An alternative signaling arrangement at each subscriber receiver is shown in FIGURE 4. Instead of merely connecting the two series-connected switches 26 and 22A across the conductors returning to the central location, an alternative can be to insert signals from a source, such as an oscillator, respectively 98, 100, which is connected in series with their switches. Thus, when both of the switches are closed across the conductors 102, 104, a signal is sent back to the central location. The oscillators 98, 100 may be any type of signal generator provided for this purpose at the receiver, or may be signals derived from the receiver, such as sync signals. The signal generator at all receivers may be made identical, thus enabling them to be mass-produced, whereby they are extremely inexpensive to manufacture. If a separate identification is desired, the signal generator may produce a unique signal or a unique signal sequence at each receiver, which is sent back to the central location at the time that that subscriber location is being detected. It will be appreciated that those skilled in the art will be readily able to provide many variations here after having had the benefit of this disclosure; therefore, it is intended that the above be exemplary, and not limiting.

At the remote location, there is provided a control-signal source 106, which is connected to the lines 102, 104. When it is desired to sample the condition of the respective program-enabling switches at the various subscriber receivers, the control-signal source is energized to provide a single pulse on the lines 102, 104. In response thereto, the various solenoids 90, 92 are energized, whereby the cam surfaces 86A, 88A are released, and the clock motors 94, 96 can commence rotating the cams 86, 88. The sequence of operation that occurs thereafter is similar to that which has been described in connection with FIGURE 2. The subscriber locations will be connected to the lines 102, 104 in sequence, at which time an indication will be applied to the line as to whether or not the program-enabling switch is closed. This is detected by the detector 108 connected to the lines 102, 104 at the central location.

The output of the detector is applied to a recorder 110. The recorder has its operation initiated in response to the signal from the control-signal source which has been applied to the lines 102, 104. The recorder is advanced in response to the same power-line signals as are the clock motors at the respective subscriber locations. Actually, it is not necessary that the recorder be operated synchronously with the operations occurring at the respective subscriber locations, since the information which is provided by the recorder is intelligible by the sequence of the recording of that information. Thus, all that is necessary is that the recorder be advancing its recording medium at a sufficiently rapid rate so that there is no possibility of a recording being made twice in the same region. It will be appreciated that the lines 102, 104 may also be the same coaxial lines as are employed for transmitting the video and audio signals to the receivers, or one of the coaxial lines may be employed with another auxiliary line in order to insure an uninterrupted program.

Figure 5:
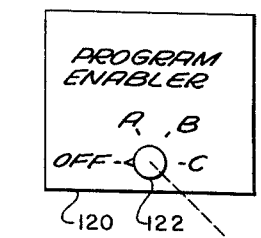
FIGURE 5 is a drawing of a cam and switch arrangement suitable for use with this invention.

Although the cam-actuated switches are shown rather large, this is for the purpose of illustration, and not as an indication from which it may be deduced that the number of switches which can be used in this system are limited. The switches may merely be a set of space points or contacts, such as shown in FIGURE 5 and indicated by reference numerals 110, 112, which are bridged by a conducting surface 114 on the cam 116. This arrangement may be substituted for either of the cams shown in FIGURE 4 or the ratchet wheels shown in FIGURE 2.

Alternatively, a conductive roller may abut on the cam surface and may be connected by a printed-circuit line to the hub of the cam, from which connection can be made for the same purpose as is indicated in FIGURES 2 and 4.

Figure 6:
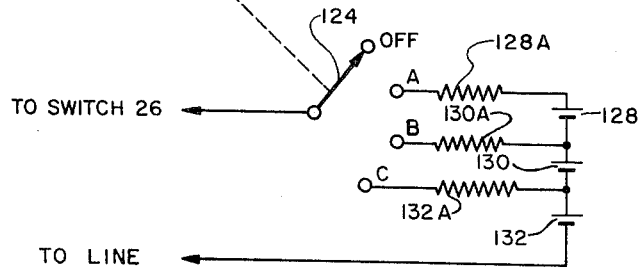
FIGURE 6 is a drawing of an arrangement at a receiver suitable for use where multiple subscription-television programs are transmitted.

FIGURE 6 exemplifies an arrangement which may be employed when a plurality of programs are provided to the subscriber from the same pair of coaxial lines. In such instance, a subscriber is obliged to select which one of the channels or programs he desires to have reproduced on his television receiver. Thus, the arrangement shown in FIGURE 6 may be employed, wherein the program enabler 120 has a selector switch 122 which can select either channel A, channel B, or channel C. This switch is ganged with another selector switch 124, which is the switch indicative of whether or not the subscriber has purchased a program and which of the three programs available has been purchased.

A switch 124 has four contact terminals, one of which corresponds to the off position, and the others, which are given the letters A, B, and C, represent the fact that they correspond to channels A, B, or C. When channel A is selected, the selector switch 124 contacts terminal A, whereby it applies to the lines extending back to the central location through the sampling switch 26, for example, the full potential made available from three batteries, respectively 128, 130, 132, which are connected in series between the contacts. Battery 128 is connected to terminal A through a resistor 128A. The junction between batteries 128 and 130 is connected to terminal B through a resistor 130A. The junction between batteries 130 and 132 is connected through a resistor 132A to terminal C. These resistors are current-limiting resistors. Battery 132 is connected to the line. The selector arm of the selector switch 124 is connected to a sampling switch, such as 26 or 28. The operation of the selector switch 124, to apply potentials having different levels to the lines running back to the central location, should be obvious. Accordingly, the detector at the central location can readily provide an output signal indicative, not only of the fact that the program has been purchased, but also which program has been purchased.

An alternative arrangement to that depicted in FIGURE 6 is to use two parallel query lines and a source of positive and a separate source of negative voltage in a simple parallel binary arrangement, to identify the channel to which a subscriber is tuned. In such an arrangement, either a positive or a negative voltage may be applied to each of two lines by a switch ganged to the channel-selector switch, so that there are four possible combinations of voltages on the two lines, indicating "off," "A," "B," or "C." The appearance of no voltage on either line, in this case, would be indicative of a fault condition.

The fact that batteries 128, 130, and 132 are shown in FIGURE 6 should not be construed as a limitation upon the invention, since it will be apparent to those skilled in the art that different impedances may be employed instead of batteries or different signal sources. Thus, this is being shown by way of illustration, and not by way of limitation.

There has accordingly been shown and described herein a novel, useful, improved, and inexpensive arrangement for obtaining the information whereby billing for subscribers to a subscription-television system may be prepared. The system is expandable to handle any number of subscribers. A central location need not be positioned at the transmitter, but, in areas where the population density is very large, the central location may be at any convenient locale, such as on a utility pole or on the roof of an apartment house, so that the segment of the population to which this central location is connected may be interrogated for the purpose of billing. Collection of the recordings which have been made in this fashion may be taken or made at some convenient time. The interrogation intervals may be initiated by a signal from a transmitting location to the central location, which can be amplified and applied as the initial control signal to start the operation of the system. Furthermore, in accordance with this invention, connection from a central location to subscribers may be made using a single set of conductors or may be made using a plurality of sets of conductors which radiate from a central location out to different groups of subscribers in the manner of the spokes of a wheel, without departing from the spirit or scope of this invention. In such case, the operation of testing each of the subscriber locations for billing purposes proceeds in sequence in the same manner described for a single set of conductors. Such testing may proceed along one set of conductors at a time or from one set to another, as desired.

I claim:

1. In a subscription-television system of the type wherein programs for which payment is sought are transmitted to a plurality of different subscriber receivers, each said subscriber receiver having a switch which is closed when it is desired to receive one of said programs, apparatus for determining at which of said subscriber receivers said switch has been closed for enabling a billing of the subscriber who thereby have purchased said program, said apparatus comprising conductors extending from a central location to each one of said subscriber receivers, means for sequentially connecting each one of said switches to said conductors, means at said central location for determining whether or not the switch which is connected to said conductors at the time is closed, and a recording means at said central location operated synchronously with said means for sequentially connecting each one of said switches to said conductors and responsive to output from said means for determining to make a record indicative of which of said switches has been closed.

2. In a subscription-television system as recited in claim 1 wherein said conductors comprise a single set of conductors extending from said central conductors to all of the subscriber receivers.

3. In a subscription television system of the type wherein programs for which payment is sought are transmitted to a plurality of different subscriber receivers, each said subscriber receiver having a switch which is closed when it is desired to receive one of said programs, apparatus for determining at which of said subscriber receivers said switch has been closed for enabling a billing of the subscriber who thereby have purchased said program, said apparatus comprising conductors extending from a central location to each one of said subscriber receivers, means at each said subscriber receiver including a normally open switch means for connecting said switch to said conductors, signal responsive means at each said receiver for closing said normally open switch means of all said receivers in a prearranged sequence, means at said central location for generating signals for operating said signal responsive means, means for connecting said means for generating signals to said conductors, means at said central location for detecting which of said normally open switches are closed, and means operative responsive to said means for generating signals and to output from said means for detecting for making a recording indicative of which of said normally open switches have been closed.

4. In a subscription television system as recited in claim 3 wherein said signal responsive means at each said receiver includes a movable cam, said cam being movable from an initial position along a path having one location at which it will close said normally open switch means, said location being different at each different subscriber receiver, means for biasing said movable cam to said initial position, and means connected to said conductors and responsive to signals from said signal generating means for advancing said cam from its initial position.

5. In a subscription television system as recited in claim 3 wherein said signal responsive means includes a movable cam, said cam being movable from an initial position along a path having one location at which it will close said normally open switch means, said location being different at each different subscriber receiver means for moving said cam along its path from said initial position, solenoid means for holding said cam at its initial position, and means for applying a signal from said conductors to said solenoid means to enable said solenoid means to release said cam from its initial position.

6. In a subscription television system as recited in claim 3 wherein said means for connecting said normally open switch to said conductors includes an oscillation signal source which has its output connected in series with said switch, and said means at said central location for detecting which of said normally open switches are closed detects the output of said oscillation signal source.

7. In a subcsription television system of the type wherein programs for which payment is sought are transmitted to a plurality of different subscriber receivers, said receivers being unable to intelligibly reproduce said programs until a subscriber agrees to make payment therefore, apparatus for determining which of said subscribers has agreed to pay for a program comprising at each receiver means including switch means operative when it is desired to view a subscription television program, said switch means including a pair of contacts which are closed when said switch means is operated, normally open contacts, signal responsive means for closing said normally open contacts at a predetermined time after the initiation of said signals, said predetermined time differing at each separate subscriber receiver from that at every other receiver means connecting said pair of contacts in series with said normally open contacts, conductor means extending from a central location to all said subscriber receivers, means connecting said series connected pair of contacts and said normally open contacts to said conductor means, means for generating signals at said central location, means for applying output from said means for generating signals to said conductor means when it is desired to determine which subscribers have purchased a program, means at said central location connected to said conductor means for detecting each successive closed pair contacts and normally open contacts, and means at said central location actuated responsive to said means for detecting for making a recording indicative of each successive closed pair of contacts and normally open contacts from which the subscribers who have purchased a program may be determined.

8. In a subscription television system as recited in claim 7 wherein said signal responsive means for closing said normally open contacts at a predetermined time after the initiation of said signals includes a rotatably supported disc, a cam carried by said disc as it is rotated for effectuating closing of said normally open contacts at one location along the rotational path, spring means connected to said disc for biasing it toward an initial position, and means connected to said conductor means and actuated responsive to signals received thereover for rotating said rotatably supported cam.

9. In a subscription television system as recited in claim 7 wherein said signal responsive means for closing said normally open contacts at a predetermined time after the initiation of said signals includes a rotatably supported disc, a cam carried by said disc as it is rotated for effectuating closing of said normally open contacts a stop carried by said disc, a solenoid actuated rod positioned in the path of said stop to prevent further rotation of said disc, means for applying a signal from said conductor means to said solenoid actuated rod to cause a withdrawal of said rod from the path of said stop, and motor means for rotating said disc at a constant speed.

10. In a subscription television system of the type wherein programs for which payment is sought are transmitted to a plurality of different subscriber receivers, said receivers being unable to intelligibly reproduce said programs until a subscriber agrees to make payment therefor, apparatus for determining which of said subscribers has agreed to pay for a program comprising at each receiver means including a pair of switch contacts which are closed when it is desired to view a subscription television program, a ratchet wheel, spring means for biasing said ratchet wheel to an initial position, a cam mounted on said ratchet wheel, said cam having a different location on said ratchet wheel relative to said initial position for each different receiver, first pawl means including a solenoid for advancing said ratchet wheel away from its initial position responsive to signals applied thereto, second pawl means for holding said ratchet wheel in position including a solenoid for inactivating said second pawl means when actuated against said spring means, a normally open switch, means holding said switch in a position to be closed momentarily by said cam as said ratchet wheel is advanced, the position of said switch being the same relative to said initial position at each receiver, conductor means extending from a central location to all said subscriber receiver locations, means at each receiver connecting said pair of switch contacts and said normally open switch in series and to said conductor means, means at each receiver connecting the solenoids of said first and second pawl means to said conductor means, means at said central location for applying a signal to said conductor means for actuating the solenoids of all said second pawl means whereby all said ratchet wheels are returned to their initial positions, advancing signal means at said central location for applying signals to said conductor means for actuating the solenoids of all said first pawl means whereby all said ratchet wheels advance together, and said normally open switches are closed successively, means at said central location connected to said conductor means for detecting the closed or open state of the switch contacts at each subscriber receiver to which it is connected by said successively closed normally open switches, and recording means at said central location operated synchronously by output of said advancing signal means to make a recording responsive to output of said means for detecting whereby a record of the number of subscribers who have purchased a program is produced.

References Cited by the Examiner
UNITED STATES PATENTS
3,021,383   2/62   Mountjoy _____ 178—5.1

DAVID G. REDINBAUGH, Primary Examiner.
ROY LAKE, Examiner.